United States Patent [19]

Swank

[11] 4,246,115
[45] Jan. 20, 1981

[54] MULTI-VALVE INTERLOCK APPARATUS

[75] Inventor: Bryan W. Swank, Columbus, Ind.

[73] Assignee: Cummins Engine Company, Inc., Columbus, Ind.

[21] Appl. No.: 937,166

[22] Filed: Aug. 28, 1978

[51] Int. Cl.³ .................. F16K 35/14; B01D 27/00
[52] U.S. Cl. ......................... 210/168; 74/483 K; 123/196 A; 137/637.1; 210/340
[58] Field of Search .............. 74/477, 483 R, 483 K, 74/878; 137/637.1; 210/89, 102, 104, 111, 113, 418, 340, 168

[56] References Cited

U.S. PATENT DOCUMENTS

| | | | |
|---|---|---|---|
| 2,185,061 | 12/1939 | Meyers | 137/637.1 |
| 2,463,737 | 3/1949 | Berck | 137/637.1 |
| 3,982,520 | 9/1976 | Wheeler | 210/418 X |

FOREIGN PATENT DOCUMENTS 1016997 10/1957 Fed. Rep. of Germany ............ 74/483
414298 8/1934 United Kingdom .
1171150 11/1969 United Kingdom .

*Primary Examiner*—Martin P. Schwadron
*Assistant Examiner*—Richard Gerard
*Attorney, Agent, or Firm*—Sixbey, Friedman & Leedom

[57] ABSTRACT

An interlock is disclosed for permitting only one of a plurality of interrelated valve elements to be operated at one time. A transverse channel is formed in each valve element for alignment with a channel formed in the valve housing when the valve elements are moved to their respective opened positions. When any one valve element is moved to its closed position, camming surfaces formed on the valve element are positioned and shaped to cause a train of end abutting links disposed within the valve and housing channels to be displaced in a manner to lock the remaining valves in their respective open positions. The valve channels and camming surfaces are formed by very simple and inexpensive linear cutting operations thereby allowing the disclosed device to be inexpensively manufactured.

35 Claims, 5 Drawing Figures

$a > b$
$c > d$

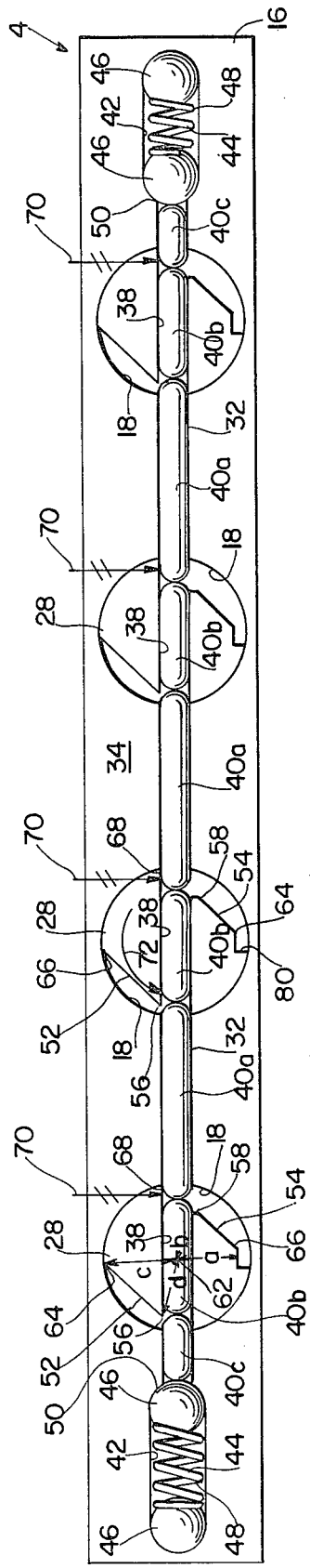
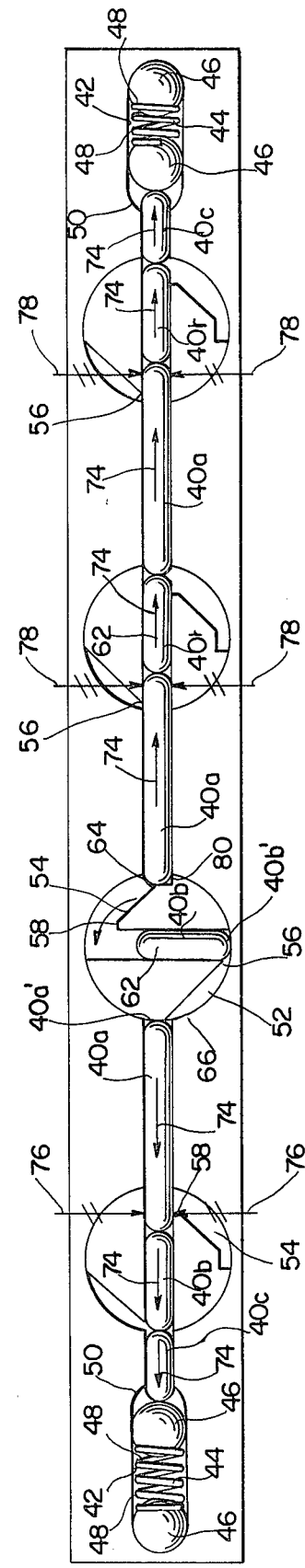
FIG. 3
FIG. 4

MULTI-VALVE INTERLOCK APPARATUS

BACKGROUND OF THE INVENTION

1. Field of Invention

This invention relates to the field of interlocks for preventing the simultaneous operation of plural interrelated devices such as valves and in particular to multi-valve interlocks for permitting the operation of only one of a plurality of valves at any one time.

2. Discussion of the Prior Art

While the advantages of interlocking the operation of a plurality of valves is well known, no interlock design has been disclosed which is characterized simultaneously by low cost, simplicity, ease of maintenance and reliability. The need for providing a multi-valve interlock arises in a variety of situations wherein it is necessary for an operator to regulate the flow of fluid through a plurality of inter-related fluid circuits which could be adversely affected if more than one of the valves were simultaneously moved to an opened or closed position. For example, in tank trucks used for dellivering various types of gasoline and other petroleum products, it is common for the truck to be provided with a separate tank section for each type of petroleum product. In such circumstances, it is necessary to assure that only one unloading valve is opened at a time to prevent air mixing in with the gasoline or other fuel and thereby causing inaccurate measurement of the volume of gasoline actually delivered. One technique for accomplishing this result is disclosed in U.S. Pat. No. 2,185,061 to Meyers wherein a tank truck manifold is disclosed having plural valves including manual operators interlocked by means of a plurality of slidable end-abutting bars whereby the opening of one valve will lock the remaining valves in a closed position. In particular, each valve operator includes a cam finger adapted to be inserted between the abutting ends of a pair of bars whenever the valve is opened to cause the bars on both sides of the cam to be displaced in opposite directions toward the remaining valves to hold these valves closed. A spring biased plunger is reciprocably mounted at the outside ends of the end abutting bars to center the bars when all of the valves are closed.

While useful in many circumstances, devices of the type noted above tend to be complicated and expensive to manufacture. For example, the prior art cam operations require manufacture separate from the valve element and each end abutting bar requires a pair of bearings to constrain the bar for longitudinal movement. Moreover, the centering force applied to the outside ends of the end abutting bars must be very carefully balanced to insure proper alignment of each pair of abutting ends with an associated cam operator. Jamming of the mechanism can thus result should the spring forces become unbalanced with the passage of time.

Other multi-valve interlock systems for use with tank trucks have been disclosed in the prior art such as illustrated in U.S. Pat. No. 2,463,737. Elongated sliding keepers are disclosed which extend between the plural valves in end abutting relationship with keeper ejectors mounted in each valve operator for sliding movement with the keepers when the associated valve is closed and for rotational movement with the operator when the associated valve is being opened. When a valve is opened, the keepers are displaced longitudinally to lock the remaining valves in a closed position. As with other designs known in the prior art, however, each keeper requires a pair of guides which must be individually mounted on the multi-valve unit thereby adding to the expense of providing such an interlock. Moreover, no mechanism is disclosed for automatically biasing the keepers and ejectors to a neutral position and thus a device of this type might render a valve inoperative simply because a keeper has not returned to a neutral position.

Another environment in which a multi-valve interlock is extremely useful is in the operation of internal combustion engine lubrication systems employing plural filter units. Such lubrication systems are often employed on engines which must be operated continuously for long periods of time, thereby necessitating the replacement of worn filter units while the engine is in operation. Large marine engines are usually equipped with this type of lubrication system. If each filter unit were associated with an independently operable shut off valve to block lubrication flow as the filter is being changed (see, for example, U.S. Pat. No. 3,982,520), it would be possible for an operator intentionally or inadvertently to block simultaneously the flow of oil through all filters. Without some sort of interlock between the various valves associated with each filter unit, all filtration of lubrication oil could thus be cut off. This problem is so severe that some marine insurance carriers now require a multi-valve interlock in the lubrication system of any marine engine which they insure. Unfortunately, no multi-valve interlock design has previously been disclosed which simultaneously offers great reliability of operation, simplicity of manufacture and ease of maintenance.

SUMMARY OF THE INVENTION

It is the general object of this invention to overcome the deficiencies of the prior art discussed above relating to a multi-valve interlock apparatus.

It is a more specific object of this invention to overcome the deficiencies of the prior art by providing a multi-valve interlock apparatus which is simple in design and yet extremely rugged and reliable in operation. More particularly, the interlock structure includes a valve housing containing plural valve cavities within which are positioned plural valve elements for controlling the flow of fluid when moved between first and second positions. A single elongated channel is formed in the valve housing with plural channels being formed in the valve elements positioned so as to align with the channel formed in the valve housing when the valve elements reside in their respective first positions, whereby an interlock formed of end abutting links may be positioned in the aligned channels.

A still more specific object of this invention is to provide interlock structure for a multi-valve header in which an elongated channel is formed in the valve housing and in each movable valve element contained in the housing wherein the interlock means includes a plurality of end abutting links positioned within the housing and valve channels. The links of the various end abutting links are chosen so as to position the various abutting ends of the links adjacent to cam surfaces formed on the valve elements shaped to cause the end abutting links on opposite sides of the respective valve elements to be moved away from each valve element upon movement of that valve element from its first to its second position. This displacement of the end abutting links causes a shift in the relative position of the adjoining ends of the end abutting links with respect to the cam surfaces formed on the remaining valve elements whereby the remaining valve elements are locked in their respective open positions.

Still another object of this invention is to provide a multi-valve interlock apparatus in which spring biasing means may be positioned at the outside ends of a plurality of end abutting links to cause the end abutting links to be moved to a neutral position in which any one of the valve elements may be moved from an open to a closed position without regard to the relative strength of the biasing means placed at the outside ends of the end abutting links and without prior manual manipulation of the links.

Still another object of this invention is to provide a method for forming the disclosed multi-valve interlock structure including inexpensive, simple mechanical steps which permit the formation of a rugged and extremely reliable interlock without expensive manufacturing steps. In particular, support for the interlock apparatus may be formed by simply cutting a channel in one side of the valve housing and a coplanar side of each valve element within which the end abutting links may be positioned followed by the step of forming enlarged cavities at each end of the channel within which the resilient biasing means may be disposed. A pair of cam surfaces may be formed on each valve element merely by cutting two parallel planar surfaces intersecting at one end the associated valve channel and oriented with respect to the rotation axis of the valve element so as to cause displacement of the end abutting links away from the valve element upon rotation between its open and its closed position. The disclosed method further permits stops to be formed on the respective valve elements to define both the open and closed positions and to prevent closing of any of the remaining valve elements upon one of the valve elements being initially closed.

A still more specific object of this invention is to provide a multi-valve header for an internal combustion engine having a recirculating lubrication system for passing lubrication fluid through plural lubrication fluid filtering units connected with the multi-valve header and an interlock means for permitting only one of the valves contained within the header to be closed at any one time.

All of the above objects are achieved by means of an extremely simple, yet reliable, multi-valve interlock design including the provision of a valve housing containing plural valve cavities within which are disposed plural valve elements movable between first and second positions to independently control the flow of fluid within a fluid circuit associated with each valve element wherein the interlock is formed by providing a linear, elongated channel within the valve housing and a plurality of valve channels intersecting the housing channel when the valve elements are moved to their respective open positions. The interlock structure is formed by placing a plurality of end abutting links within the housing and valve channels such that the adjoining ends of the end abutting links are positioned adjacent to the leading edge of a pair of cam surfaces formed on opposite sides of a valve element and oriented so as to cause the end abutting links on both sides of each valve element to be moved away from the rotational axis of the valve element when it is rotated from its open to its closed position. Displacement of the links on both sides of the valve element which has been opened results in the remaining valve elements being locked in their respective closed positions.

Numerous additional objects and advantages of this invention can be understood by reference to the drawings and the description of the preferred embodiment contained hereinbelow.

SUMMARY OF THE DRAWINGS

FIG. 3 is a schematic diagram of the configuration of the multi-valve interlock apparatus designed in accordance with the subject invention wherein the various valve elements are in their respective open positions, FIG. 4 is a schematic diagram of the multi-valve interlock apparatus illustrated in FIG. 3 wherein one of the valve elements has been moved to its closed position and the remaining valve elements have been locked in their respective open positions.

DESCRIPTION OF THE PREFERRED EMBODIMENT

Figure 1:
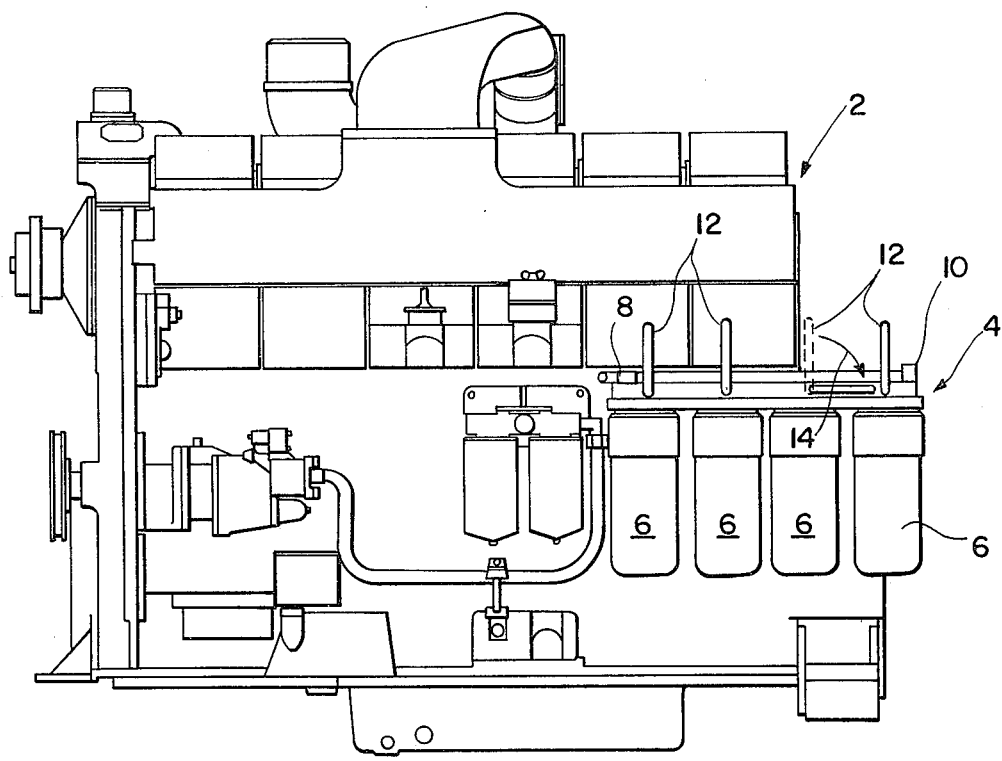
FIG. 1 is a side elevational view of an internal combustion engine provided with a multi-valve interlock system in accordance with the subject invention.

FIG. 1 illustrates an important application of the subject invention to the control of lubrication oil through a plurality of oil filters mounted on an internal combustion engine. In many environments, it is vitally important that an internal combustion engine be capable of continuous operation over an extended period of time. It has long been recognized that the life of an internal combustion engine may be greatly extended by continuously filtering the lubrication oil which is normally recirculated throughout the engine during its operation. Obviously, the need for extended periods of operation and continuous filtering of the lubrication oil can become impossible to achieve when the oil filter becomes clogged or needs to be changed unless special provision is made for continued filtration of the lubrication oil while the old oil filter is being replaced. Normally this is accomplished by providing a plurality of oil filters connected to a common multi-valve header wherein flow to and from each oil filter may be shut off by means of an associated valve while the existing oil filter is replaced. Without some form of interlock, it would then become possible for all of the valves to be simultaneously moved to a closed position thus producing a dangerous situation in which the lubrication oil of the internal combustion engine is not being filtered by any of the oil filters. Through inattention or inadvertence, an engine operator might mistakenly adjust the various valves to the closed position in the mistaken belief that the various valves are in fact being moved to the open position. Should this occur, the internal combustion engine could continue to operate for an extended period of time without filtration of the lubrication oil. Eventually, this condition could lead to catastrophic results. For example, if the engine were used as a power plant on a marine vessel, the power plant could suffer very costly damage to say nothing of the potential loss of the vessel, its cargo, passengers and crew.

Referring now more specifically to FIG. 1, an internal combustion engine 2 of the diesel type is illustrated in combination with a multi-valve header 4 to which a plurality of oil filter units 6 are removably connected. Oil from the engine lubrication system is provided to inlet port 8, passed through one or more of the oil filters and returned to the engine through outlet port 10. Associated with each oil filter unit 6 is a valve operator handle 12 arranged to open and close an associated valve (not illustrated) for shutting off lubrication flow between the associated oil filter and both the inlet and outlet ports of the multi-valve header 6. When in the vertical position, valve operator handles 12 indicate that the associated valve is open to thus permit flow of lubricating oil through the associated filter unit.

When one of the valve elements 12 is moved as illustrated by arrow 14 into a horizontal position, the valve associated therewith is closed, thereby cutting off flow of oil into and out of the associated filter unit 6 to permit replacement thereof. As will be described in more detail hereinbelow, the subject invention is concerned with the provision of an interlock, not illustrated in FIG. 1, which is designed to permit only one of the valve operator handles 12 to be moved to the horizontal position at any one time which means that at all times, at least three of the filter units 6 will be in fluid communication with the recirculating lubrication circuit of the internal combustion engine 2.

Figure 2:
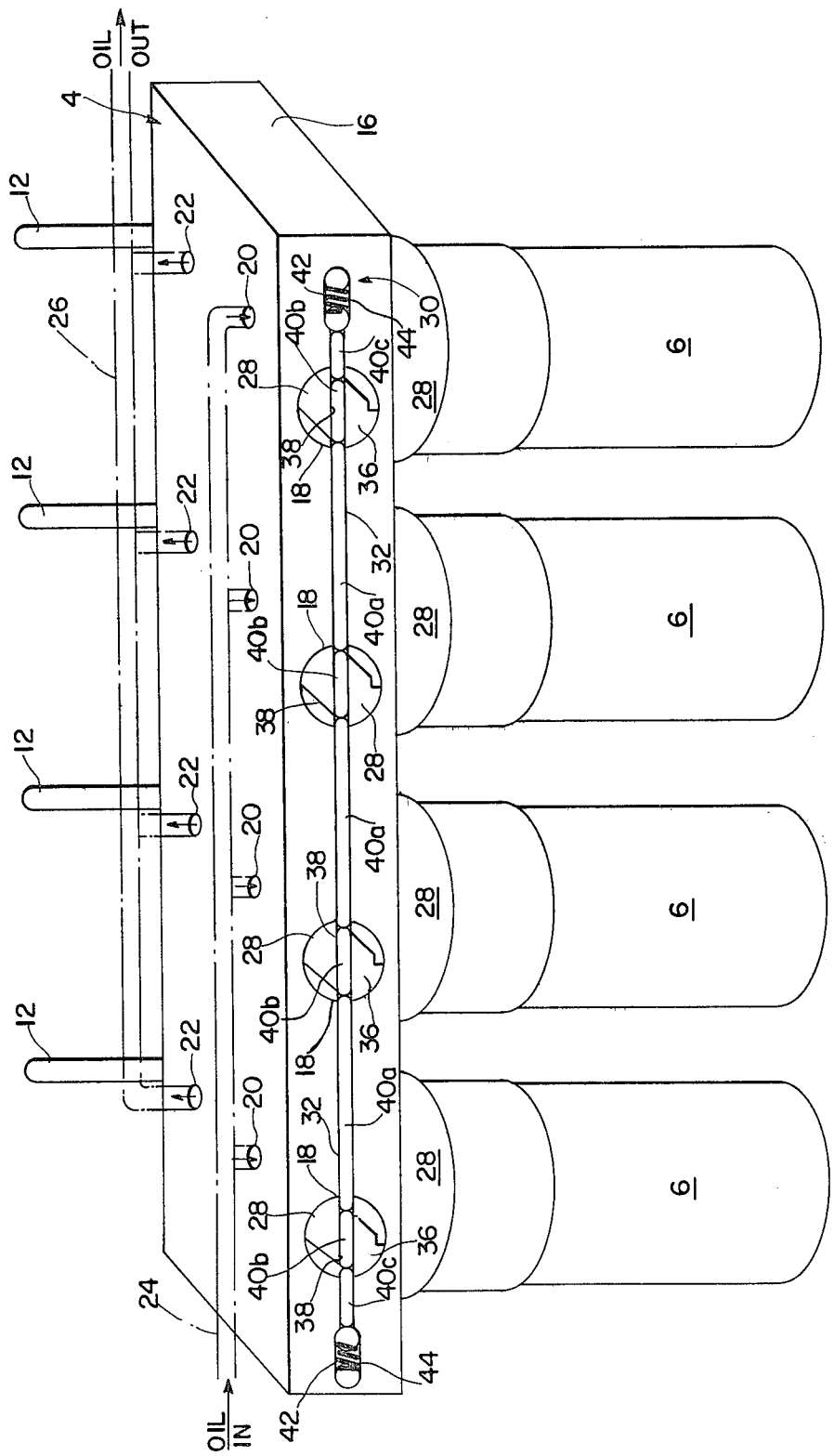
FIG. 2 is a perspective view of the multi-valve interlock apparatus illustrated in FIG. 1. in combination with an internal combination with an internal combustion engine.

FIG. 2 is a perspective illustration of the multi-valve header 4 illustrated in FIG. 1 as viewed from the engine side. The header includes a valve housing 16 containing plural valve cavities 18. Each cavity communicates with an inlet port 20 and an outlet port 22 connected, respectively, to an inlet conduit 24 (illustrated in dashed lines) for supplying oil to the respective oil filter units 6. An outlet conduit 26 (illustrated in dashed lines) is connected to each of the outlet ports 22 for receiving oil which has passed through each of the respective oil filter units 6. Each of the inlet and outlet ports 20 and 22 intersect with the associated valve cavity 18 and pass through the valve housing 16 into the corresponding oil filter connectors 28 provided with inlet passages (not illustrated) for directing oil received from inlet ports 20 into the oil filter and outlet passages (not illustrated) for providing oil which has passed through the filter to the outlet ports 22.

Disposed within each valve cavity 18 is a valve element 28 having passages formed therein for alignment with the respective inlet and outlet ports 20 and 22 when the valve element is moved to a first position as illustrated in FIG. 2. Each valve element is connected to a valve operator handle 12 and may be rotated within its respective valve cavity about a single rotational axis upon movement of the respective operator handle 12 from the illustrated vertical position into a horizontal position. When moved into such a position, the passages within valve element 28 are no longer in registry with the inlet and outlet ports 20 and 22 and thus oil flow into and out of each filter unit 6 is appropriately blocked when the respective valve operator handle 12 is in any position other than vertical.

FIG. 2 further discloses the interlock mechanism 30 which, as discussed above, is designed to permit only one of the valve elements to be moved from its open position at any one time. This interlock mechanism includes an elongated housing channel 32 formed in one side 34 of valve housing 16 extending in a direction so as to intersect with each of the valve cavities 18. Each valve element 28 has an end face 36 coplanar with side 34 of valve housing 16. A valve channel 38 is formed in the end face 36 of each valve element in a position to be in alignment with the elongated housing channel 32 when the respective valve element 28 is in its open position.

Disposed within the housing and valve element channels 32 and 38, are a plurality of end abutting links 40 dimensioned so as to be slidable longitudinally within the respective channels. The ends of each link are rounded, i.e., semi-spherical to provide a camming action. The longer links 40a extend between the respective valve cavities 18 while the shorter links 40b are disposed within the valve channels 38 of each valve element 18. End links 40c are disposed at the outer limits of the chain of end abutting links 40. Cavities 42 slightly larger than the housing channel 32 are formed at each end of the housing channel so as to permit resilient biasing structure to be located therein for the purpose of causing the chain of end abutting links to be centered relative to the ends of the housing channel so long as all of the valve elements are moved to their opened position.

Reference will now be made to FIGS. 3 and 4 for the purpose of describing in detail the operation of the valve interlock illustrated in FIG. 2. Those elements illustrated in FIG. 2 which are again illustrated in FIGS. 3 and 4 have been assigned the same reference numerals. As is more clearly illustrated in FIGS. 3 and 4, enlarged cavities 42 contain a resilient biasing structure 44 formed by a pair of metal balls 46 such as ball bearings having a diameter slightly less than cavity 42 but greater than the diameter of elongated housing channel 32. Interposed between the balls 46 is a compression spring 48. The end abutting links are longitudinally dimensioned so that their aggregate length corresponds exactly to the length of elongated housing channel 32. Accordingly, when all of the valve elements 28 are moved to their respective first positions, spring 48 spreads the associated balls apart by a distance equivalent to the length of each enlarged cavity 42, thereby centering the chain of end abutting links 40 exactly between the ends of the elongated housing channel 32. The ball within each cavity 42 closest to the end of housing channel 32 operates as a stop for engaging the end portion 50 of a cavity 42 immediately adjacent the end of housing channel 32. This very precise positioning of the links 40 is very critical to the reliable operation of the subject invention as can be more clearly understood by considering the manner by which the respective links cooperate with valve elements 28 to provide the interlock function.

In addition to the valve channel 38 formed in the end face of each valve element co-extensive with side 34 of valve housing 16, a pair of cam surfaces including a first cam surface 52 and a second cam surface 54 are formed on the valve elements 28 so as to intersect with the associated valve channel 38 as illustrated in FIGS. 3 and 4. Note that one edge 56 of first cam surface 52 (defined by the intersection of the first cam surface and valve channel 38) is positioned adjacent the adjoining ends of a pair of end abutting links while the edge 58 of second cam surface 54 (defined by the intersection of the second cam surface with channel 38) is positioned immediately adjacent the opposite end of the abutting link 40b positioned within the valve channel 38. Edges 56 and 58 are further positioned inwardly relative to the central rotational axis 62 of each valve element 28. Each abutting link 40b has a length corresponding to the longitudinal distance between edges 56 and 58 which causes end abutting links on either side of the valve element to project inwardly into valve cavity 18 when the respective valve element is in its open position.

The cooperation of each valve element with the links 40 can be more clearly understood by referring to the left most valve element illustrated in FIG. 3 wherein the central rotational axis of this valve element is indicated at 62 and the respective distances from the central axis to edges 56 and 58 are shown as distances "d" and "b" respectively. The edges 64 and 66 of first and second cam surfaces, respectively, are located at the extreme ends of the first and second cam surfaces. Edges 64 and 66 are respectively spaced from the rotational axis 62 by distances "c" and "a". As can be seen in FIG. 3, distance "a" is greater than the distance "b" and the distance "c" is greater than the distance "d". Accordingly, when a valve element such as the second valve element from the left hand edge of valve housing 16 is rotated from the position illustrated in FIG. 3 to the position illustrated in FIG. 4, the end abutting links on both sides of the valve element 28 are caused to move away from the central axis 62 because the ends of the corresponding end abutting links 40a are first engaged with the first and second cam surfaces at edges 56 and 58, respectively, and are pushed away from the rotational axis of the valve element. Upon further rotation of the valve element, the rounded ends of links 40a are caused to ride over the surfaces of the respective cam surfaces and are thus pushed away from the rotational axis of the valve element being rotated. When the various end abutting links 40 are positioned as illustrated in FIG. 3, one of the end abutting links 40 is positioned partially within the valve housing channel 32 and partially within the valve element channel 38 of each corresponding valve element 28. A portion 68 of the valve element adjacent this end abutting link, thus, operates as a stop for engaging the corresponding end abutting link projecting therein and prevents the valve element from rotating clockwise as illustrated in FIG. 3. Movement of the valve element in a clockwise direction as indicated by arrow 70 when the valve element is in the first position is thus prevented. When a valve element is rotated from its open position toward its closed position by rotation as indicated by arrow 72 in FIG. 3, the various end abutting links are moved away from the rotational axis of that valve element all as discussed above and as illustrated by the arrows 74 appearing in FIG. 4.

FIG. 4 further discloses that the end abutting links to the left of the valve element 28 are moved such that one end of a link 40a is displaced to the left of terminal edge 58 of each valve element positioned to the left of the closed valve. In the example of FIG. 4, only one valve element is located to the left of the closed valve. When so displaced, the valve elements 28 to the left of a opened valve element would be held in their respective closed position as demonstrated by arrows 76. With respect to the valve elements to the right of a closed valve, an end abutting link 40a moves inwardly toward the rotational axis 62 of each such valve element past the terminal edge 56 so as to lock the corresponding valve element in its open position as illustrated by arrows 78. FIG. 4 further illustrates the compressed condition of resilient biasing structure 44 whereby the balls immediately adjacent the outside ends of the chain of end abutting links are caused to be displaced so as to compress springs 48.

Note further that a notch is formed in each valve element adjacent edge 64 of the second cam surface 54 to thus form a flat surface 80 oriented perpendicularly to the longitudinal axis of the valve channel 38. As is shown in FIG. 4, the flat surface 80 operates as a stop to prevent further counterclockwise rotation of each valve element when the valve element reaches its fully closed position. In summary, the end of each valve element 28 if formed to cooperate with the chain of end abutting links so as to at all times prevent clockwise movement of the valve element beyond its open position and counterclockwise movement beyond its closed position. Moreover, the cam surfaces formed on each valve element are positioned and oriented to allow any one of the valve elements to be moved from its opened to its closed position and in so doing causes the remaining valve elements to be locked in their opened position.

When a closed valve, such as illustrated in FIG. 4, is returned to its open position, the rounded ends 40a' and 40b' cooperate in a camming fashion as the corresponding valve element 28 means its open position to permit the ends 40a' and 40b' to slide relative to one another back into the end abutting relation as illustrated in FIG. 3.

Figure 5:
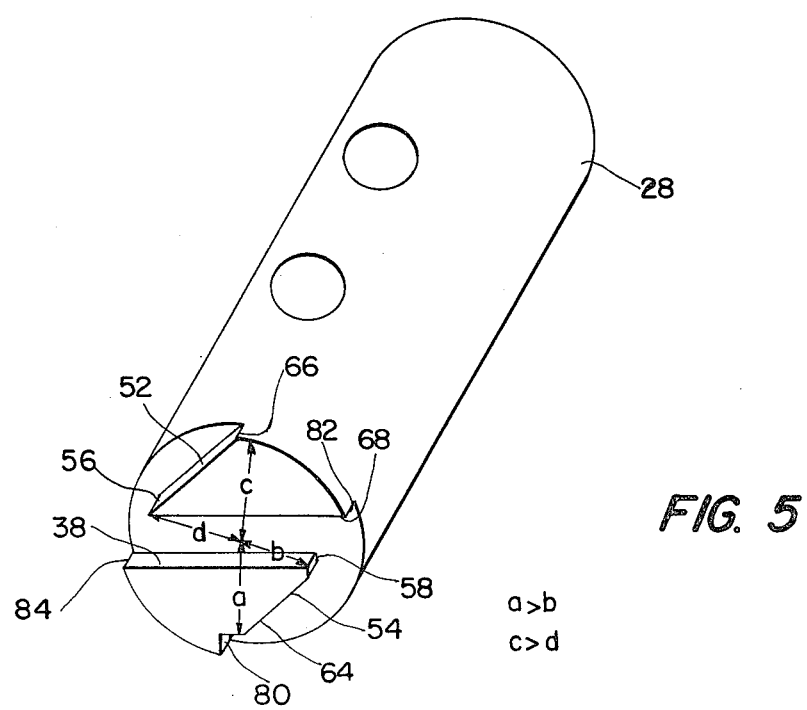
FIG. 5 is a perspective view of a single valve element as illustrated in FIGS. 2–4 illustrating the valve channel and cam surfaces formed in accordance with the subject invention.

Turning now to FIG. 5, the very significant advantages derived from forming the end surfaces of a valve element in the manner disclosed in FIGS. 2-4 is more clearly illustrated by an enlarged perspective view of one of the valve elements. In particular, the various portions of the valve element identified in FIGS. 3 and 4 have been assigned the same reference numerals in FIG. 5. As can now be very clearly observed in FIG. 5, the necessary channel and cam surfaces may be produced by cutting the channel 38 with a milling tool moved in a diametrical direction across the end face of a valve element 28 to form a channel having a square cross-section. The same milling too may than be used to form first and second cam surfaces 52 and 54 by moving the milling tool and valve element relative to one another along a pair of linear paths arranged at an acute angle relative to the longitudinal axis of channel 38 and oriented so that the milling tool clears edges 82 and 94 as the tool is moved along the linear paths. Finally, flat surface 80 may be formed by cutting an additional small notch adjacent the outer edge 64 of the first cam surface 54.

It can thus be appreciated that the interlock mechanism disclosed in the subject invention not only provides a very rugged, easily maintained and reliable structure for performing the function of allowing one valve in a multi-valve mechanism to be closed at any one time, but also permits the valve to be manufactured by means of an effective manufacturing process involving very simple mechanical cutting steps along linear paths. Thus, the valve element can be formed without expensive curvilinear cam surfaces or other complicated mechanical forming steps that have been thought to be required heretofore. The necessary mechanical steps in forming the cooperating valve housing channel 32 and enlarged end cavities 42 may be similarly carried out by linear relative movement of a milling tool to cut the elongated housing channel in the valve housing. As with the valve channel, the elongated housing channel is cut with a milling tool to form a channel having a square cross section.

Having thus described the invention, what is claimed as novel and desired to be secured by Letters Patent of the United States is:

1. A multi-valve apparatus comprising:
   (a) a valve housing containing plural valve cavities, each said valve cavity including at least one fluid flow port, said valve housing also having at least one outer surface with a housing channel disposed therein to intersect each of said valve cavities;
   (b) plural valve elements respectively mounted within said valve cavities, each said valve element being movable between a first position in which fluid may flow through said fluid flow port and a second position in which flow is prevented from flowing through said fluid flow part, each said valve element having a valve face with a valve channel disposed therein to align with said housing channel such that said valve and housing channels together form a continuous elongated channel across said outer surface when said plural valve elements are all moved to said first position; and
   (c) interlocking means interposed within said housing channel and said valve channels for locking all remaining said valve elements in said first position whenever any one of said plural valve elements is moved to said second position.

2. A multi-valve apparatus as defined in claim 1 wherein said housing channel and valve channels have a depth and width sufficient to providing sliding clearance for said interlocking means.

3. A multi-valve apparatus as defined in claim 2, wherein each said valve face is coplanar with said outer surface of said valve housing.

4. A multi-valve apparatus as defined in claim 2 wherein said interlocking means interposed within said housing and valve channels includes a plurality of end abutting links.

5. A multi-valve apparatus as defined in claim 4 wherein said housing channel terminates at both ends thereof in end sections which have larger cross-sectional areas than the cross-sectional areas of the portions of said housing channel respectively adjacent said end sections.

6. A multi-valve apparatus as defined in claim 5 wherein each said housing channel end section has a resilient centering means disposed therein for biasing said end abutting links toward a central position between said housing channel end sections, each said resilient centering means including a stop surface for engaging one end of the associated housing channel end section when said end abutting links are centered within said housing channel.

7. A multi-valve apparatus as defined in claim 4 wherein each said valve element has a pair of cam surfaces intersecting with the associated valve channel of each said valve element.

8. A multi-valve apparatus defined in claim 7 wherein said cam surfaces include a pair of planar surfaces on opposite sides of said valve element, each said planar surface terminating at a first edge adjacent the abutting connection between a pair of links in said interlock means when all of said valve elements are in said first position.

9. A multi-valve apparatus as defined in claim 8 wherein one of said cam surfaces includes a flat surface oriented perpendicularly to the longitudinal axis of said valve channel, said flat surface being positioned at the furthest end of said cam surface from said valve channel, said flat surface forming a stop for engaging one of said end abutting links when said valve element is moved to said second position.

10. A multi-valve apparatus as defined in claim 8 wherein said valve elements are rotatable between said first and second positions and wherein said first edge of each said planar surface is positioned from the rotational axis of said valve element at a first radial distance and a second edge opposite said first edge of each said planar surface is positioned at a second radial distance from the rotational axis, said second radial distance being greater than said first radial distance whereby said end abutting links on both sides of a valve element are displaced away from the rotational axis of a valve element when said valve element is rotated to said second position.

11. A multi-valve apparatus as defined in claim 10 wherein said second distance is sufficiently greater than said first distance to cause upon movement of one said valve element to said second position at least one abutting link associated with each of the remaining valve elements to be moved into a position partially within said housing channel and partially within a portion of the valve channel between said first edges of said planar surfaces associated with each of the remaining said valve elements, thereby respectively locking the remaining said valve elements in said first positions upon movement of any one of said valve elements to said second position.

12. A multi-valve apparatus as defined in claim 11 wherein the ends of each end abutting link are formed to accommodate slight manufacturing imperfections and positional variations between said links and said valve elements.

13. A recirculating lubrication system for removing impurities from lubrication fluid in an internal combustion engine, said recirculating lubrication system comprising:
   (a) a multi-valve header containing plural valve cavities, each said valve cavity including an inlet port for receiving lubricating from a first lubrication conduit and an outlet port for returning fluid to a second lubrication conduit, said multi-valve header also having a least one outer surface with a header channel disposed therein to intersect each of said valve cavities;
   (b) a filtering means for removing impurities from the lubrication fluid, said filtering means including a plurality of detachable filter units respectively connected to receive lubrication fluid from said inlet ports in said valve cavities and to return lubrication fluid to said outlet ports in said valve cavities;
   (c) plural valve elements respectively mounted within said valve cavities, each said valve element being movable between a first position in which a flow path is formed through the inlet port, filter unit and outlet port associated with each said valve element and a second position in which flow is shut off through the inlet port, filter unit and outlet port associated with each said valve element, each said valve element having a valve face with a valve channel disposed therein to align with said header channel such that said valve and header channels together form a continuous elongated channel across said outer surface when said plural valve elements are all moved to said first position; and
   (d) interlocking means interposed within said header channel and said valve channels for locking all remaining said valve elements in said first position whenever any of said plural valve elements is moved to said second position.

14. A recirculating lubrication system as defined in claim 13 wherein the header channel and valve channels have a depth and width sufficient to provide sliding clearance for said interlocking means.

15. A recirculating lubrication system as defined in claim 14 wherein each said valve face is coplanar with said outer surface of said multi-valve header.

16. A recirculating lubrication system as defined in claim 14 wherein said interlocking means interposed within said header and valve channels includes a plurality of end abutting links.

17. A recirculating lubrication system as defined in claim 16 wherein said header channel terminates at both ends thereof in end sections which have larger cross-sectional areas than the cross-sectional areas of the portions of said header channel respectively adjacent said end sections.

18. A recirculating lubrication system as defined in claim 17 wherein each said header channel end section has a resilient centering means disposed therein for biasing said end abutting links toward a central position between said header channel end sections, each said resilient centering means including a stop surface for engaging one end of the associated header channel end section when said end abutting links are centered within said header channel.

19. A recirculating lubrication system as defined in claim 16 wherein each valve element has a pair of cam surfaces intersecting with the associated valve channel of each valve element.

20. A recirculating lubrication system as defined in claim 19 wherein said cam surfaces include a pair of planar surfaces on opposite sides of the valve element, each said planar surface terminating at a first edge adjacent the abutting connection between a pair of links in the interlock means when all of said valve elements are in the first position.

21. A recirculating lubrication system as defined in claim 20 wherein one of said cam surfaces includes a flat surface oriented perpendicularly to the longitudinal axis of said valve channel, said flat surface being positioned at the furthest end of said cam surface from said valve channel, said flat surface forming a stop for engaging one of said end abutting links when said valve element is moved to said second position.

22. A recirculating lubrication system as defined in claim 20 wherein said valve elements are rotatable between said first and second positions and wherein said first edge of each said planar surface is positioned form the rotational axis of said valve element at a first radial distance and a second edge opposite said first edge of each said planar surface is positioned at a second radial distance from the rotational axis, said second radial distance being greater than said first radial distance whereby the end abutting links on both sides of a valve element are displaced away from the rotational axis of a valve element when said valve element is rotated to said second position.

23. A recirculating lubrication system as defined in claim 23 wherein said second distance is sufficiently greater than said first distance to cause upon movement of one of said valve elements to said second position at least one end abutting link associated with each of the remaining valve elements to be moved into a position partially within said header channel and partially within the valve channel between said first edges of said planar surfaces associated with each of the remaining said valve elements, thereby respectively locking the remaining said valve elements in said first positions upon movement of any one of said valve elements to said second position.

24. A recirculating lubrication system as defined in claim 23, wherein the ends of each said end abutting link are formed to accommodate slight manufacturing imperfections and positional variations between said links and said valve elements.

25. Interlock apparatus comprising:
(a) an interlock support base having a first surface with a plurality of displaceable element supports jointed thereto, said interlock support base also having a base channel formed in said first surface to intersect each said displaceable element support;
(b) plural displaceable elements respectively mounted within said displaceable element supports, each said displaceable element being movable between a first position and a second position, each said displaceable element having an element face with an element channel disposed therein to align with said base channel such that said element and base channels together form a continuous elongated channel when said plural displaceable elements are all moved to said first position; and
(c) interlocking means interposed within said continuous elongated channel to lock all remaining displaceable elements in said first position whenever any one of said plural displaceable elements is moved to said second position.

26. A multi-valve apparatus comprising:
(a) a valve housing including
(1) plural valve cavities formed in said valve housing, each said valve cavity having at least one fluid flow port, and
(2) a housing channel formed in said valve housing to intersect each said valve cavity, said housing channel terminating at both ends thereof in end sections which have larger cross-sectional areas than the cross-sectional areas of the portions of said housing channel respectively adjacent said end sections;
(b) plural valve elements respectively mounted within said valve cavities, each said valve element being movable between a first position in which fluid may flow through said flow port and a second position in which flow is prevented from flowing through said fluid flow port, each said valve element having a valve channel alignable with said housing channel to form a single channel when said plural valve elements are all moved to said first position;
(c) interlocking means interposed within said housing channel and said valve channels for locking all remaining said valve elements in said first position whenever any one of said plural valve elements is moved to said second position, said interlocking means including a plurality of end abutting links; and
(d) resilient centering means disposed within each said housing channel end section for biasing said end abutting links toward a central position between said housing channel end sections, each said resilient centering means including a stop surface for engaging one end of the associated housing channel end section when said end abutting links are centered within said housing channel.

27. A recirculating lubrication system for passing lubrication fluid through plural filter units in a combustion engine, said recirculating lubrication system comprising:
(a) a multi-valve header having plural valve cavities formed therein, each said valve cavity including an inlet port for receiving lubrication fluid from a first lubrication conduit and an outlet port for returning lubrication fluid to a second lubrication conduit, said multi-valve header also having a header channel formed therein to intersect each said valve cavity, said header channel terminating at both ends thereof in end sections which have larger cross-sectional areas than the cross-sectional areas of the portions of said header channel respectively adjacent said end sections;
(b) a filtering means for removing impurities from the lubrication fluid, said filtering means including a plurality of detachable filter units respectively connected to receive lubrication fluid from said inlet ports in said valve cavities and to return lubrication fluid to said outlet ports in said valve cavities;
(c) plural valve elements respectively mounted within said valve cavities, each said valve element being movable between a first position in which a flow path is formed through the inlet port, filter unit and outlet port associated with each said valve element and a second position in which flow is shut off through the inlet port, filter unit and outlet port associated with each said valve element, each said valve element having a valve channel alignable with said header channel to form a single elongated channel when said plural valve elements are all moved to said first position;
(d) interlocking means interposed within said header channel and said valve channels for locking all remaining said valve elements in said first position whenever any of said plural valve elements is moved to said second position, said interlocking means including a plurality of end abutting links; and
(e) resilient centering means disposed within each said header channel end section for biasing said end abutting links toward a central position between said header channel end sections, each said resilient centering means including a stop surface for engaging one end of the associated header channel end section when said end abutting links are centered within said header channel.

28. A multi-valve apparatus comprising:
(a) a valve housing containing plural valve cavities, each said valve cavity including at least one fluid flow port, said valve housing also having a housing channel disposed therein to intersect each said valve cavity;
(b) plural valve elements respectively mounted within each of said valve cavities for rotation between a first position in which fluid may flow through said fluid flow port and a second position in which flow is prevented from flowing through said fluid flow port, each said valve element having a valve channel disposed therein to align with said housing channel such that said valve and housing channels together form a continuous elongated channel when said plural valve elements are all rotated to said first position; and
(c) interlocking means interposed within said housing channel and said valve channels for locking all remaining said valve elements in said first position whenever any one of said plural valve elements is rotated to said second position.

29. A multi-valve apparatus as defined in claim 28 wherein said housing channel and valve channels have a depth and width sufficient to provide sliding clearance for said interlocking means.

30. A multi-valve appratus as defined in claim 29 wherein said interlocking means interposed within said housing and valve channels includes a plurality of end abutting links.

31. A multi-valve apparatus as defined in claim 30, wherein each said valve element has a pair of cam surfaces intersecting with the associated valve channel of each said valve element.

32. A multi-valve apparatus as defined in claim 31 wherein said cam surfaces include a pair of planar surfaces on opposite sides of said valve element, each said planar surface terminating at a first edge adjacent the abutting connection between a pair of links in said interlock means when all of said valve elements are in said first position.

33. A multi-valve apparatus as defined in claim 32 wherein one of said cam surfaces includes a flat surface oriented perpendicularly to the longitudinal axis of said valve channel, said flat surface being positioned at the furthest end of said cam surface from said valve channel, said flat surface forming a stop for engaging one of said end abutting links when said valve element is moved to said second position.

34. A multi-valve apparatus as defined in claim 32 wherein said first edge of each said planar surface is positioned from the rotational axis of said valve element at a first radial distance and a second edge opposite said first edge of each said planar surface is positioned at a second radial distance from the rotational axis, said second radial distance being greater than said first radial distance whereby said end abutting links on both sides of a valve element are displaced away from the rotational axis of a valve element when said valve element is rotated to said second position.

35. A multi-valve apparatus as defined in claim 34 wherein said second distance is sufficiently greater than said first distance to cause upon movement of one said valve element to said second position at least one abutting link associated with each of the remaining valve elements to be moved into a position partially within said housing channel and partially within a portion of the valve channel between said first edges of said planar surfaces associated with each of the remaining said valve elements, thereby respectively locking the remaining said valve elements in said first positions upon movement of any one of said valve elements to said second position.

* * * * *